Jan. 25, 1938.　　　　E. G. HALLQUIST　　　　2,106,566
WHEEL
Filed July 17, 1933　　　2 Sheets-Sheet 1
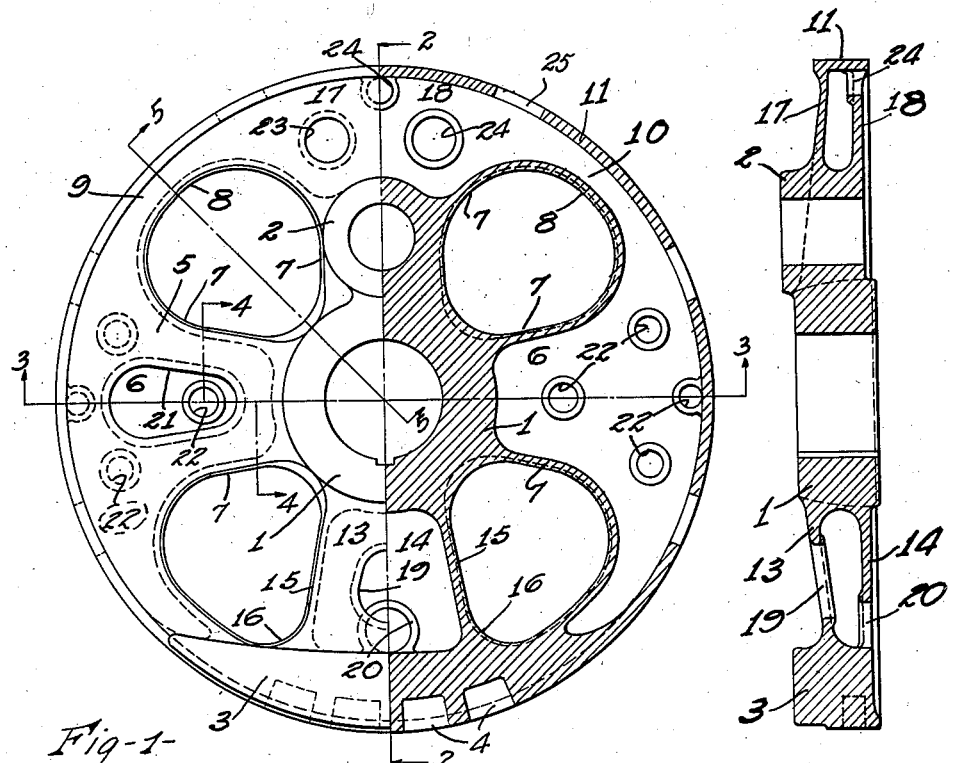
Fig-1-　　　Fig-2-
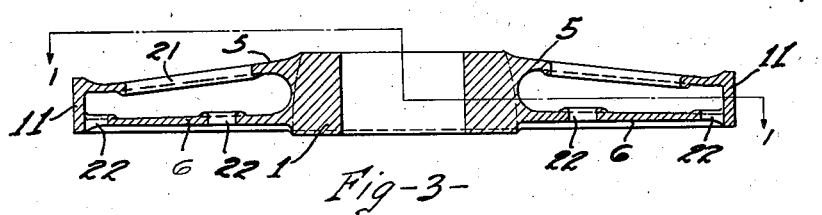
Fig-3-
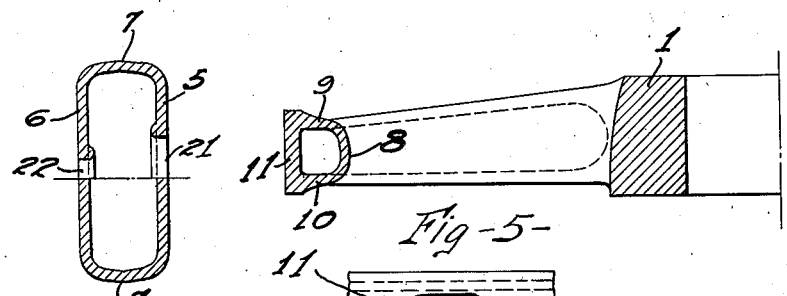
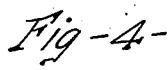
Fig-4-　　Fig-5-
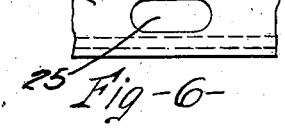
Fig-6-
Inventor
Einar G. Hallquist
By Rodney Bedell
    atty

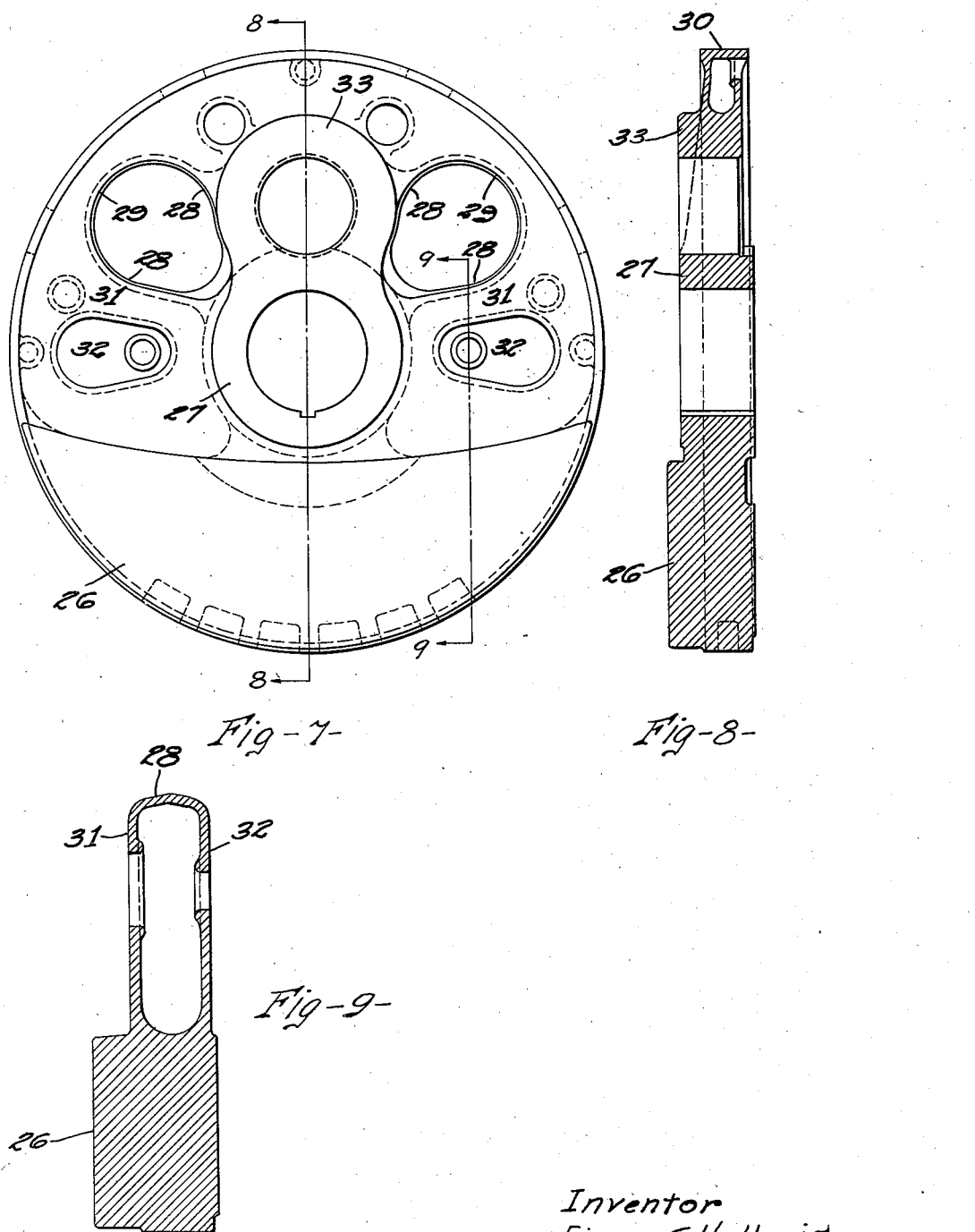

Patented Jan. 25, 1938

2,106,566

UNITED STATES PATENT OFFICE 2,106,566

WHEEL

Einar G. Hallquist, Wallingford, Pa., assignor to General Steel Castings Corporation, Granite City, Ill., a corporation of Delaware Application July 17, 1933, Serial No. 680,726

3 Claims. (Cl. 295—28)

This invention relates to railway vehicle wheels and particularly to locomotive drivers, although some of the principles thereof may be advantageously applied to truck wheels.

One object of the invention is to provide a novel spoked wheel structure designed to attain the maximum strength with the use of a minimum of metal by forming as much of the wheel as possible of box section construction.

Another object is to eliminate stress concentration which results when spokes sharply meet the hub or rim of the wheel.

Another object is to provide an improved wheel or wheel center structure arranged to be readily cast in one piece.

Oelkers Patent 1,862,157 illustrates various forms of railway vehicle wheels having U-section spokes, the webs and flanges of adjacent spokes extending radially and circumferentially and merging adjacent the rim of the structure to form arch elements. Ties are provided at intervals around the rim between the front and rear walls of the structure but no peripheral web is shown extending around and reinforcing the rim. Box section railway wheels have been suggested, but in these the spokes have been comparatively sharply connected with the rim and frequently in these constructions the side walls of the spokes do not merge with the hub so as to directly carry radial forces between the hub and rim.

In the wheel structure forming the subject of the present invention, box section spokes are used, the side walls of adjacent spokes radiating from the hub of the structure and merging with each other in arches adjacent the rim. A peripheral web extends around the rim between the front and rear walls of the structure and forms box section rim structure with the spoke arches and the crank pin hub. Restricted openings are provided in the inner and outer walls of the spokes and in the peripheral web to facilitate casting. In the accompanying drawings which illustrate the invention—

Figure 1 is a side view and a section of a locomotive driving wheel center taken, in part, on the line 1—1 of Figure 3.

Figure 2 is a vertical transverse section taken on the line 2—2 of Figure 1.

Figure 3 is a transverse section at 90° to Figure 2 and taken on the line 3—3 of Figure 1.

Figures 4 and 5 are partial transverse sectional views taken on the corresponding section lines of Figure 1.

Figure 6 is a detail edge view showing a portion of the rim of the structure.

Figure 7 is a side view showing a modified form of wheel.

Figures 8 and 9 are vertical transverse sectional views taken on the corresponding section lines of Figure 7.

In Figures 1 to 6 of the drawings is illustrated a driving wheel center structure preferably cast in one piece and including axle hub 1, crank pin hub 2, and counterbalance weight 3 extending along a portion of the rim of the structure and recessed at 4 for receiving lead in adjusting the counterbalance. The spokes are of box section including broader walls 5 and 6, which may be termed inner and outer walls of the structure, and side walls 7 which merge with the solid annulus of hub 1 and extend radially and then circumferentially therefrom and merge in gently curving arches 8 adjacent the rim of the structure. These arches extend from spoke to spoke whereby compressive forces are uniformly distributed and stress concentration, due to sharp intersection of the spoke with the rim, is eliminated.

The inner and outer walls 5 and 6 similarly merge between adjacent spokes, as at 9 and 10, and a transversely disposed peripheral web 11 extends around the rim between the walls 9 and 10. Web 11 with walls 5 and 6 including portions 9 and 10, the arches 8, and the side of crank pin hub 2, form a box section rim structure extending between the ends of the counterbalance as clearly shown in Figures 2, 3 and 5.

The box section spoke between the axle hub and the counterbalance is of somewhat different shape, the counterbalance 3 with which walls 13, 14 and 15 merge cutting off a portion of this spoke. Side walls 15 curve somewhat more sharply, as at 16, than the side walls of the other spokes to merge with the arched portions of the adjacent spokes. Diametrically opposite the counterbalance, walls 17 and 18 form a box section structure with the rim web 11 and the side of the crank pin hub 2.

The broader walls of the spokes are perforated, as at 19, 20, 21, 22, 23 and 24, to facilitate casting and lighten the structure, these perforations being relatively small so that the spokes may be properly termed as of box section. The rim web 11 is provided with restricted cleaning openings 25.

The structure in Figures 7 to 9 is substantially similar to that in the previous form except that counterbalance portion 26 is larger and extends substantially to the axle hub 27. The side walls 28 of adjacent box section spokes merge in gently curving arches 29 adjacent the peripheral rim web 30 which forms box section rim structure with the arches 29, the front and rear walls 31 and 32, and the edge of the crank pin hub 33.

The box shaping of the spokes and rim better adapts these parts to withstand the forces applied to a vehicle wheel for a given weight of metal than other shapes, such as channel, solid, etc. The wheel center construction illustrated is well adapted as to its properties of strength and balance to resist forces which a locomotive driving wheel must withstand. However, the principles of the invention may be advantageously applied to other forms of railway vehicle wheels. If desired, a flanged tread may be formed integral with the wheel center structure. The wheel centers illustrated have spokes merging in curved arches and these spokes may merge to advantage in Gothic or pointed arches.

The exclusive use of these and other modifications as come within the scope of the appended claims is contemplated.

What is claimed is:

1. A locomotive driving wheel structure including a hub annulus of solid cross-section, spokes radiating therefrom, each being of hollow box-section with the inner ends of all of its walls merging with said solid cross-section annulus and with the outer ends of each of its walls, which extend transversely of the wheel structure, terminating in a substantially quarter circle arc to merge with the corresponding wall of an adjacent spoke to form a substantially semi-circular arch connecting the spokes, and a peripheral rim web spaced outwardly from the arch forming portions of the spoke transverse walls to form a hollow box-section rim portion between the main axes of adjacent spokes.

2. A railway vehicle cast wheel structure comprising a hub having a substantially solid section adjacent the wheel opening, a substantially continuous transverse web forming a peripheral rim, spokes extending between said hub and rim, said spokes including front and rear walls and including spaced side walls extending transversely of the general plane of the wheel and merging with said hub solid section and giving the spoke a substantially box-like cross section contour transversely of its length and throughout its length.

3. A railway vehicle cast wheel structure comprising a hub portion of solid section from side to side of the wheel, a substantially continuous transverse web forming a peripheral rim, spokes between said hub and rim, each of said spokes having two spaced walls disposed transversely of the general plane of the wheel and each arched at its outer end to merge with the opposing walls of the adjacent spoke and each merging at its inner end with the hub solid section, said spokes also having spaced walls paralleling the general plane of the wheel, at least one of which is substantially continuous between said transverse walls and between said spokes and rim.

EINAR G. HALLQUIST.